United States Patent
Turner, Jr. et al.

(10) Patent No.: US 6,478,954 B1
(45) Date of Patent: Nov. 12, 2002

(54) DEBRIS COLLECTING APPARATUS

(75) Inventors: Richard R. Turner, Jr., Bloomfield; Robert Kircher, Clark; Dennis R. Moran, Caldwell, all of NJ (US)

(73) Assignee: Fresh Creek Technologies, Inc., Cedar Grove, NJ (US)

( * ) Notice: Subject to any disclaimer, the term of this patent is extended or adjusted under 35 U.S.C. 154(b) by 0 days.

(21) Appl. No.: 09/875,691

(22) Filed: Jun. 6, 2001

(51) Int. Cl.[7] .......................... E03F 5/14; B01D 29/25; B01D 29/27
(52) U.S. Cl. ....................... 210/162; 210/131; 210/170; 210/237; 405/87; 405/94; 405/96; 405/100
(58) Field of Search ............................ 210/162, 237, 210/131, 170; 405/87, 94, 95, 92, 96, 100

(56) References Cited

U.S. PATENT DOCUMENTS

| | | | |
|---|---|---|---|
| 236,585 A | * | 1/1881 | Hemingway |
| 530,816 A | * | 12/1894 | Wright |
| 699,176 A | * | 5/1902 | Hough |
| 766,850 A | * | 8/1904 | Smith |
| 1,324,082 A | * | 12/1919 | Strange |
| 2,199,788 A | * | 5/1940 | Durdin, Jr. |
| 2,468,249 A | * | 4/1949 | Wadleigh |
| 2,636,296 A | * | 4/1953 | King |
| 2,996,189 A | * | 8/1961 | Salterbach |
| 3,850,804 A | * | 11/1974 | Taylor et al. |
| 4,186,091 A | * | 1/1980 | Sutton |
| 4,576,512 A | * | 3/1986 | Combs et al. |
| 4,582,601 A | * | 4/1986 | Strow et al. |
| 4,892,652 A | * | 1/1990 | Rudy et al. |
| 5,419,832 A | * | 5/1995 | Heinen et al. |
| 5,562,819 A | | 10/1996 | Turner, Jr. |
| 5,707,527 A | * | 1/1998 | Knutson et al. |

FOREIGN PATENT DOCUMENTS

| | | | |
|---|---|---|---|
| EP | 825304 | * | 2/1998 |
| WO | 94/17896 | * | 8/1994 |
| WO | 99/27204 | * | 6/1999 |

OTHER PUBLICATIONS

Fresh Creek Technologies, Inc., *Shorelines Newsletter*, vol. 2, No. 3, Summer 1993.

* cited by examiner

Primary Examiner—Thomas M. Lithgow
(74) Attorney, Agent, or Firm—Wood, Herron & Evans, L.L.P.

(57) ABSTRACT

A floating debris removal system has a bypass or overflow grate that is hinged at the top and positioned to swing downstream under certain conditions. The grate is fastened with a shear ring that will break when sufficient force is generated against the grate by the flow of overflow water and debris through the system. A plow-shaped member pivots off upwardly as flow increases. The member has a plow-shaped blade that spreads the flow across the inlet of the trap of the system to reduce the velocity of the flow. The shape and weight of the blade are selected for optimal function under a range of water levels and flow velocities, and can be altered to perform best for different installations. Debris pits are provided before or after the traps of the system to collect small suspended debris that is not removed by the traps. The pits are sized and configured to slow the velocity of the flow of that the suspended debris settles into the pits. Guide pits on the traps ride in vertical rails to facilitate loading and removal of the traps in the system, while a third plate-like rail on the face of a service ladder guides the downstream end of the traps, while simplifying the overall construction, minimizing surfaces on which dirt can collect, and conserving space.

11 Claims, 9 Drawing Sheets

DEBRIS COLLECTING APPARATUS

The present invention relates to the collection and removal of floating debris from water flows, and particularly from combined sewer overflows.

BACKGROUND OF THE INVENTION

Trash and debris floating on the surfaces of waterways or along shorelines and beaches is a highly visible form of water pollution, which is receiving attention for its adverse, polluting effect and for its unaesthetic appearance of the surfaces of lakes and other water bodies. One type of system for the collecting and removing of floating debris has consisted of arrays of disposable mesh nets installed in receiving bodies of water in the flow path of a sewer outlet, particularly in applications referred to as "Combined Sewer Overflows" or "CSOs". Such systems are described in Vol. 2, No. 3, of Fresh Creek Technologies, Inc. "Shorelines" newsletter. Systems of this type are effective in collecting floatables or trash for removal and are shown in Fresh Creek Technologies, Inc. Netting Trashtrap™ Product Bulletin. Improvements in such devices are described in U.S. Pat. No. 5,562,819, owned by the assignee of the present application, which provides an underground, in-line apparatus for trapping and collecting debris in a sewer or storm flow conduit, a secondary trap which provides continued protection when primary collection traps are full, a system which signals when primary bags or nets are full and servicing is required, and a trapping facility in which bags or nets may be replaced without loss of trapping protection during servicing.

More specifically, the device in the patent referred to above includes an enclosure or chamber with an inlet and an outlet each adapted to be connected to a sewer, storm drain conduit or outflow. A debris removing system is disposed within the chamber between the inlet and the outlet for trapping and collecting water borne debris entering at the inlet and thereby providing for an outflow of substantially debris-free water. The enclosure includes an access opening comprising upper doors or hatches or access hatches in the enclosure sized to allow the debris removing system to be removed and replaced. The debris removing system specifically includes a perforated container having an open end facing the inlet of the chamber. The perforated container includes a netting assembly that traps and collects the trash or floating debris. The container is in the form of a netting assembly having a flexible bag-shaped mesh net attached to a frame. The netting assembly is attached to lifting structure having supports or handles for allowing the frame and net to be lifted out when the net if full of captured debris. In some applications, a bypass weir or screen is provided to normally direct flows from the chamber inlet through the open end of the net while allowing flow to bypass the net and flow to the chamber outlet when the net is full of debris.

Sensing and signaling elements are typically provided for sensing and signaling the passage of solid debris around the net when the net is full of debris and is in need of servicing. The sensing and signaling elements may include mechanical structure which permits passage of water, but is displaced by impingement of solid debris flowing around the nets. Displacement of such mechanical structure signals when the net is full of debris, for example, by actuating a visible flag above ground or by actuating an electrical switch which activates an aboveground indicator or remote indicator. The sensing and signaling may include an optical sensor for detecting the passage of debris around the netting assembly. Upon detection of debris, the optical sensor emits a signal indicating that the trap is full of debris. The signal may also activate an aboveground indicator or a remote indicator.

Multiple trap systems are employed in which the enclosure includes side-by-side trap assemblies. Such systems may be configured such that, upon filling of the first trap, the flow and debris can be diverted over a bypass weir disposed between the inlet ends of the first and second traps so that flow is thereby directed through the second trap and overflow debris is trapped and collected. Closure panels may be provided in a stationary frame structure disposed adjacent the inlet ends of the traps in either the single-trap systems or the multitrap systems to restrain debris from flowing through the chamber during servicing.

Floating debris removal systems are designed to predefined peak flow rates established through monitoring and modeling based on maximum size reported storms for certain historic periods. Such modeling does not necessarily take into account the actual maximum possible amount of flow due to future record storms or particularly localized concentrations of precipitation or water flow concentration due to changing surface conditions. Bypass devices have been provided in such systems to release excessive pressures, but localized fluctuations in the flow patterns can cause imbalance forces causing premature triggering of such bypass devices. Ideal control of these devices in such situations has been lacking in the prior art.

Further, in such systems, removal from the water stream of suspended solids, particularly small suspended solids, has not been provided. In addition, in all systems of the prior art, the changing of the nets of the trap in the main contributor to the cost of servicing and maintaining the system. Accordingly, improvements in such systems that contribute to the efficiency of the net-changing task are continuously needed by such systems.

Accordingly, needs exist for improvements in such floating debris removal systems that will address the problems set forth above.

SUMMARY OF THE INVENTION

A primary objective of the present invention is to provide floating debris removal systems with the ability to handle extreme flow conditions, and, more particularly, to do so without disabling the debris removal capability of the system.

A secondary objective of the present invention is to provide such systems with the ability to more effectively remove debris from the water stream, including particularly the removal of suspended solids, such as small suspended solids.

It is a further objective of the invention to provide such debris removal systems with more efficient structures for changing of the nets of the trap.

According to certain principles of the present invention, a floating debris removal system is provided with a bypass weir or overflow screen or grate that is hinged at the top and positioned to swing downstream under certain conditions. The screen is fastened to fixed structure at the bottom with a shear ring or other shear device that will break when sufficient force is generated against the screen by the flow of overflow water and debris through the system.

According to other principles of the invention, one or more velocity dissipating members is provided adjacent the inlet. In the illustrated embodiment, one or more plow-shaped members is pivotally connected above the inlet of the system to pivot off of the bottom and open upwardly as flow increases. The plow-shaped member has, for example, a plow-shaped blade that spreads the flow across the inlet of the trap of the system to dissipate the energy of the flow and thereby reduce the velocity of the flow. The shape and weight of the blade are selected for optimal function under a range of water levels and flow velocities. The blade can be altered to perform best for different installations.

According to certain aspects of the invention, collection pits are provided before or after the traps of the system to collect small suspended solids or sediments that are not otherwise removed by the traps. The pits are sized and configured to promote the settling of suspended solids or sediments into the pits that may include objects smaller than the mesh of the nets of the traps.

In accordance with further aspects of the invention, the traps are provided with guide pins at the upstream of the traps of the frame thereof adjacent the mouths of the nets. The pins ride in vertical rails to facilitate loading and removal of the traps in the system. A third plate-like rail, preferably on the face of a service access ladder, helps guide the downstream end of the traps, while simplifying the overall construction, minimizing surfaces on which dirt can collect, and conserving space.

These and other objectives and advantages of the present invention will be more readily apparent from the following detailed description of the preferred embodiments of the invention, in which:

DETAILED DESCRIPTION OF THE PREFERRED EMBODIMENT

Figure 1:
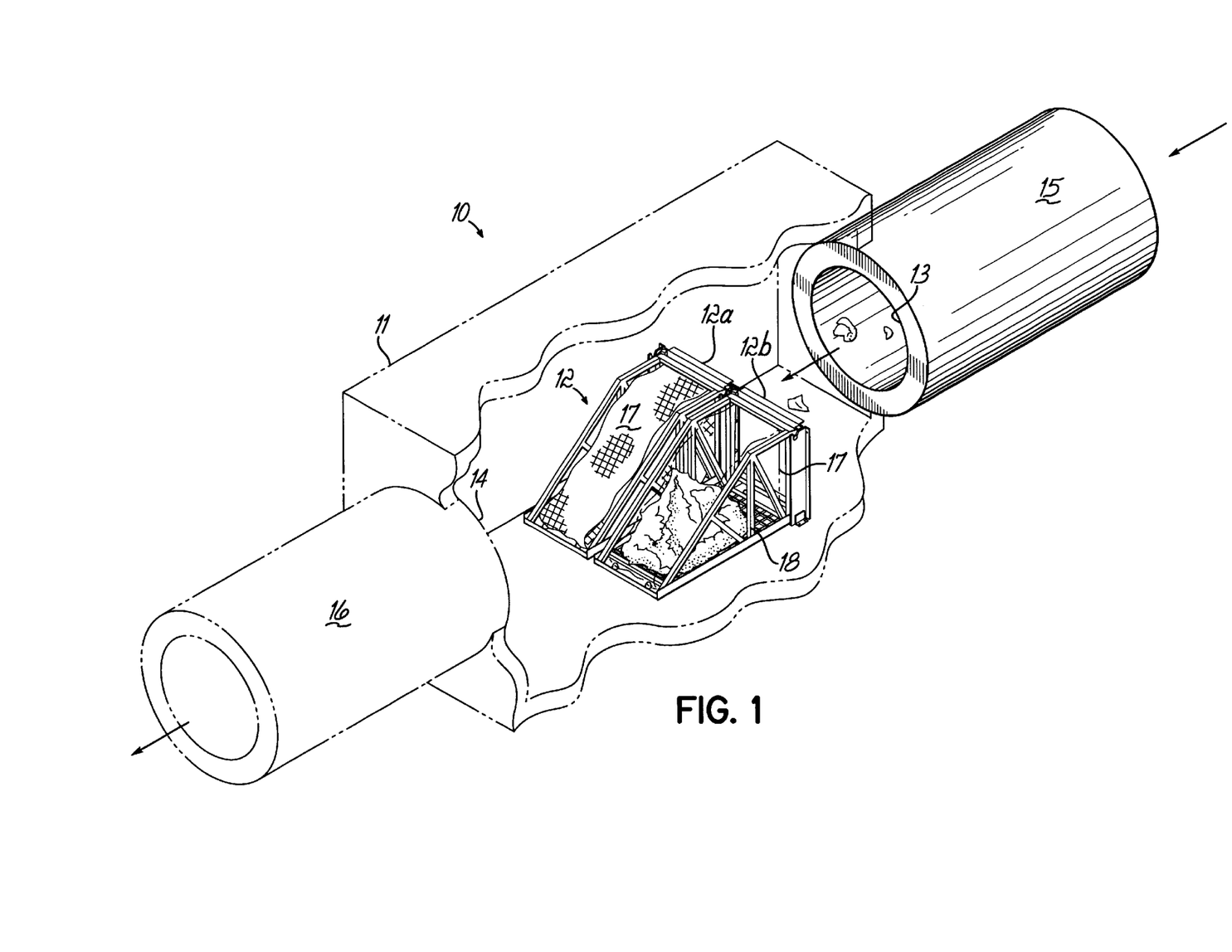
FIG. 1 is a perspective view showing the common features of a debris removal system of the prior art.

FIG. 1 illustrates the basic components of one system 10 of the prior art described in the background of the invention above. The system 10 includes one or more traps 12, illustrated as two in number, separately designated as traps 12a and 12b. The traps 12a,12b are located within a flow-constraining housing or enclosure 11 between inlet 13 and outlet 14 thereof. The inlet 13 and the outlet 14 are each respectively connected in a known manner to conduits 15 and 16, which may be storm drain or combined sewer conduits or other structures or the terrain of the site. The traps 12a,12b each include a netting assembly 19 formed of a bag-shaped mesh net 17 that is attached to a lifting basket 18. Each of the netting assemblies 19 captures and holds floatable velocity borne debris 20 entering enclosure 11 through inlet 13. The arrows 25 indicate the direction of water flow.

Perforations or openings in nets 17 may vary in size depending on the intended use, with sizes generally in the range of from about 0.1" to about 2". Nets 17 are open on the upstream facing end 17a thereof, toward inlet 13 of enclosure 11. Upper support members (not shown in FIG. 1) are attached to lifting baskets 18 for allowing the netting assemblies 19 of traps 12a,12b to be lifted out of enclosure 11 for periodic removal of captured debris. The netting assemblies 19 are configured such that the nets 17 provide a large filter area for the size of the mouth, thereby minimizing head loss. For example, 80 square feet of net 17 may be provided for a netting assembly mouth area of 6½ square feet, resulting in a pressure drop across a net 17 of three or four pounds.

A bypass weir (not shown in FIG. 1) or screen is typically located upstream of traps 12 and on one side of inlet 13 to permit continued flow in the event that the nets 17 of traps 12a, 12b are filled to capacity with debris. To signal that nets 17 of the netting assemblies 19 of traps 12a, 12b are in need of replacement or emptying, sensing and signaling mechanisms may be provided. The multiple trap system 10 can be configured to provide continuous and uninterrupted capture of debris through second trap 12b after the netting assembly of first trap 12a has been filled and during the process of removing and replacing it. While servicing is being performed, movable panels can be positioned in front of each respective trap 12a or 12b being serviced, as necessary, prior to its removal from enclosure 11. In this way, the system 10 is protected against passage of floatable debris during net removal and replacement.

Figure 1A:
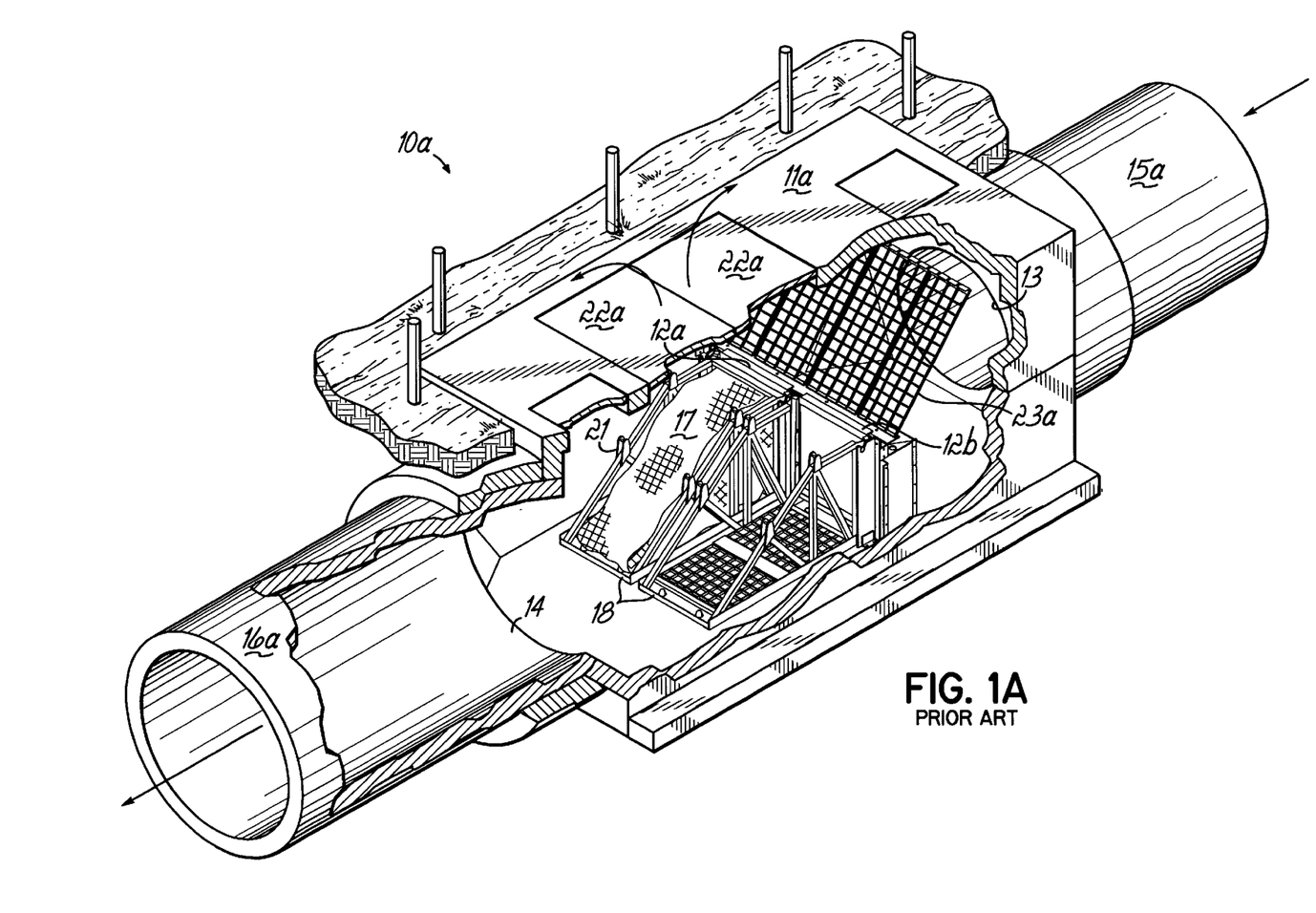
FIG. 1A is an underground in-line version of the prior art system of FIG. 1.
Figure 1B:
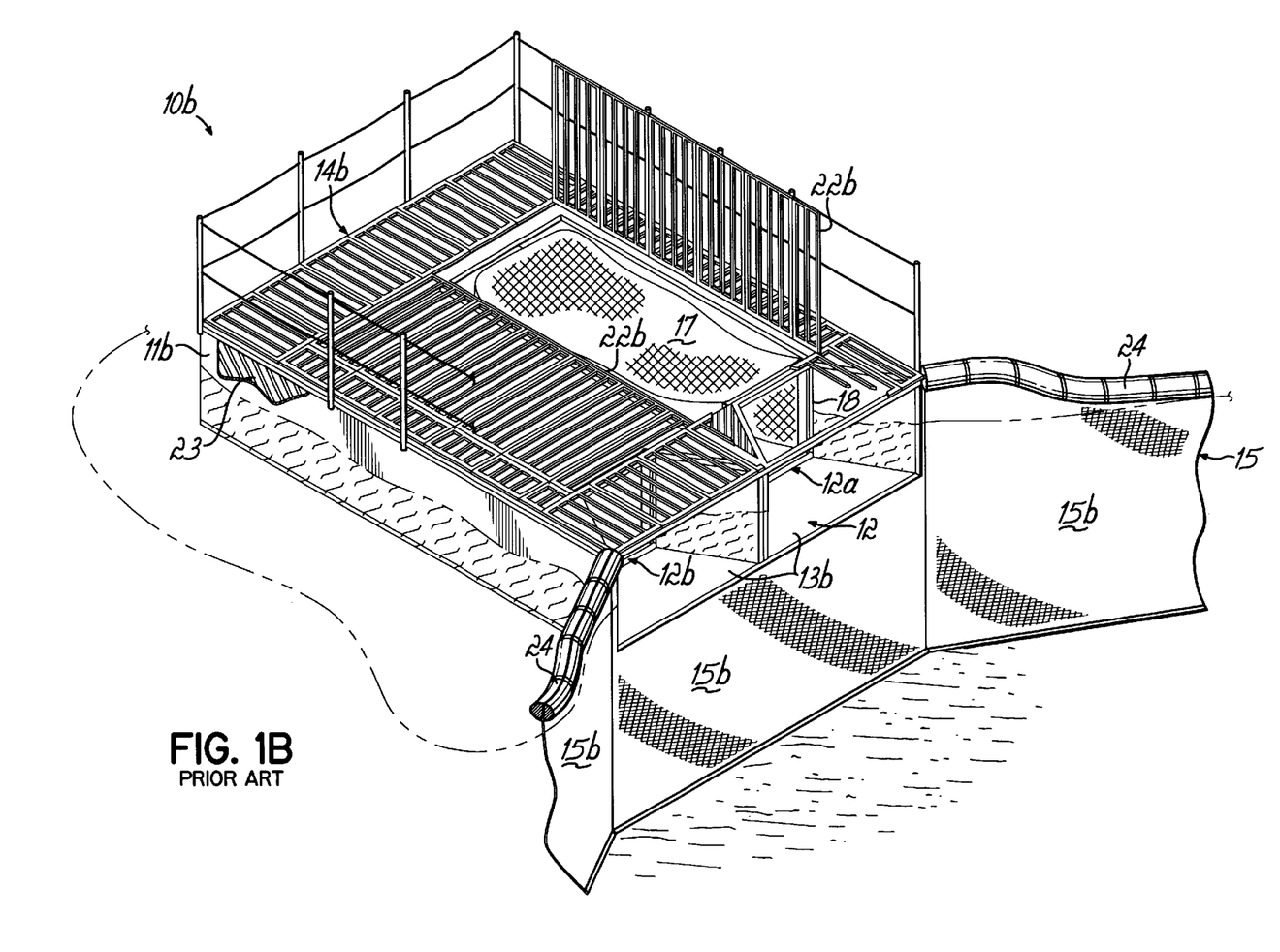
FIG. 1B is a floating version of the prior art system of FIG. 1.
Figure 1C:
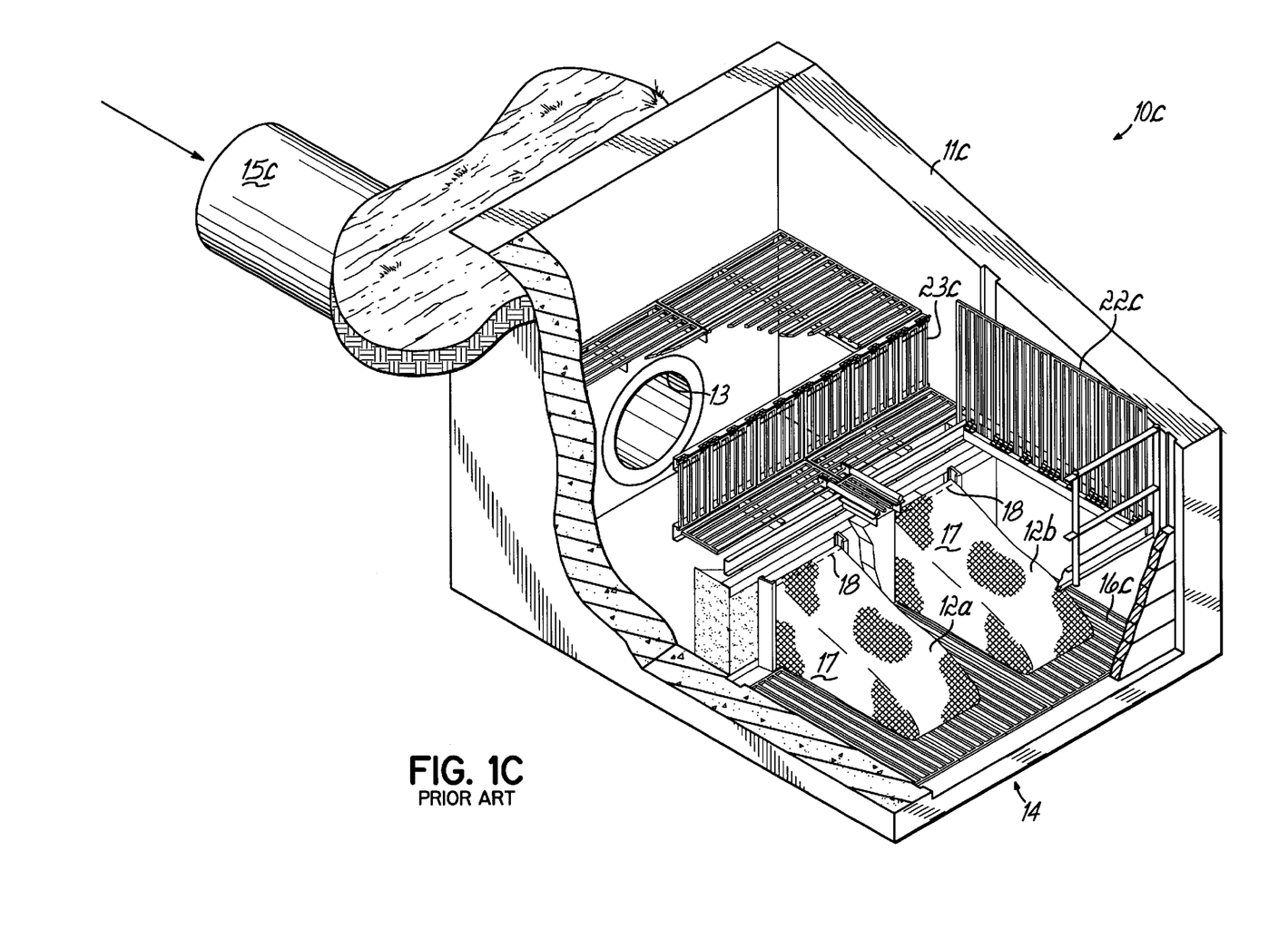
FIG. 1C is an end-of-pipe version of the prior art system of FIG. 1.

FIGS. 1A–1C illustrate the basic system 10 of the prior art in three environments. These arrangements are generally described in a publication of the United States Environmental Protection Agency, Office of Water, No. EPA 832-F-99-037, September, 1999, hereby expressly incorporated by reference herein.

In particular, in FIG. 1A, an in-line system 10a is illustrated in which the two traps 12a,12b are contained in an enclosure in the form of an underground or subterranean vault 11a. The vault 11a includes its inlet 13a and its outlet 14a respectively connected to conduits in the form of buried pipes 15a, 16a, for example, of a storm drain. The in-line traps 12a, 12b each include a netting assembly 19 with a mesh net 17 installed in and held in place by a respective lifting basket 18. A lifting bridle (not shown) is attached to upper support members 21 of the lifting basket 18 for allowing the netting assemblies 19 of traps 12a and 12b to be lifted out of vault 11a through doors 22a for periodic removal of captured debris. A bypass screen 23a is located above the traps 12a,12b to allow flow to divert from the inlet 13a to permit continued flow in the event that nets 17 of the traps 12a, 12b are both filled to capacity with debris.

In FIG. 1B, a floating system 10b is illustrated that is configured to float in a body of water in front of a stream, pipe or other water source from which enters into the body of water a flow of water containing trash or floatables to be removed by the system. The direction of water flow into and through the system 10b is also indicated by arrows 19. The floating system 10b also includes two traps 12a,12b shown in a floating hull 11b that is provided with closed cell foam panels 23 and pontoons to float the hull at the surface 28 of the body of water. The traps 12a,12b also each include a mesh net 17 held in place within a lifting support 18a. Because the system 10b is floating and the traps 12a,12b are immersed in water, a less extensive support frame 18a is substituted for the lifting basket 18 of system 10a, described above.

In the system 10b, the hull 11b has its inlet 13b extending above and below the surface 28 of the water so that trash or floatables at and immediately below the surface enter through it into the interior of the hull 11b. The hull 11b has its outlet 14b below the water surface 28 on the back of the hull 11b. The inlet conduit 15 is formed of a set of curtains 15b which hang from below the inlet 13b and from floats 24 extending respectively between the hull 11b on both sides of the inlet 13b to the shore on the opposite sides of the flowing source, connected to buried concrete conduits (not shown) of a storm drain, for example. The curtains 15b may extend from the water surface 28 to the bottom 29 of the water body and channel water from the source into the inlet 13b. The traps 12a, 12b are supported in the hull 11b in a manner similar to the way they are supported in the vault 11a described above. They can be lifted out of hull 11b through grate doors 22b for periodic removal of captured debris from the nets 17 thereof.

In FIG. 1C, an end-of-pipe system 10c is illustrated in which the two traps 12a,12b are shown in an enclosure in the form of a surface mounted three-sided concrete headwall and knee wall enclosed cavity 11c having an open end that defines its outlet 14c. The cavity 11c has its inlet 13c connected to a pipe 15c draining into the cavity 11c. The traps 12a, 12b each include a net assembly 19 having a mesh net 17. A fiberglass drain grating 16c is provided beneath the netting assemblies 19 to allow flow to exit each net 17 through its bottom to the outlet 14c of the enclosure 11c. The net 17 of each netting assembly is attached to a lifting structure (not shown), which may be similar to the lifting basket 18 described in FIG. 1A above, or in the form of lifting frame 18a described in FIG. 1B above where the traps 12a,12b are submerged. Door grates 22c are provided above the traps 12a, 12b to permit them to be raised for periodic removal of captured debris. A bypass weir 23c may be located above the traps 12a,12b to allow flow to divert from the inlet 13 to permit continued flow in the event that traps 12a, 12b are both filled to capacity with debris.

Figure 2A:
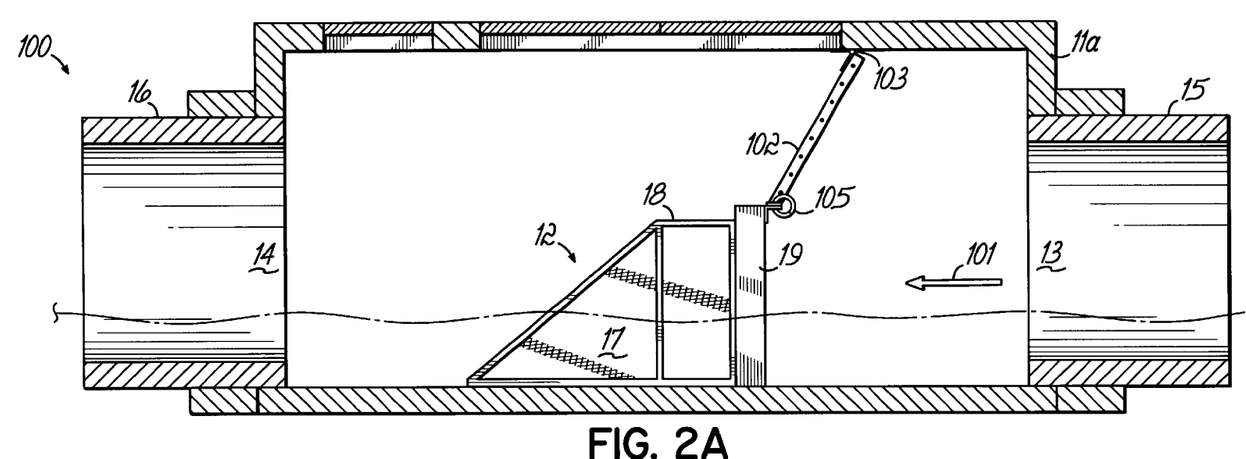
FIGS. 2A and 2B are cross-sectional views of a system similar to that of FIG. 1A embodying certain features of the present invention.
Figure 2B:
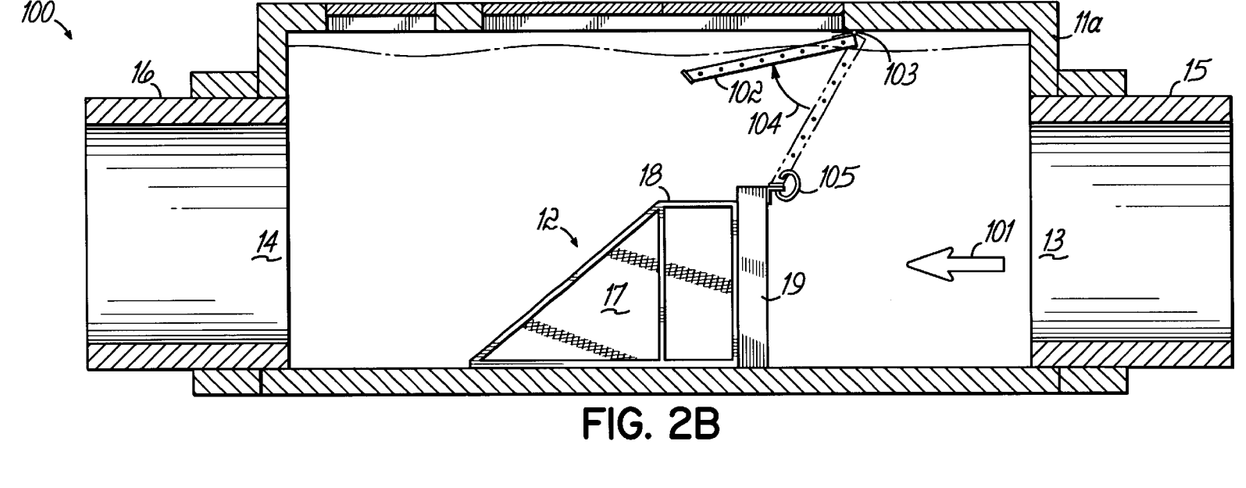

One aspect of the present invention is embodied in the system 100 illustrated in FIGS. 2A and 2B. The system 100 is similar to debris removal systems 10 of FIG. 1, particularly to version 10a and 10c thereof, which are illustrated in FIGS. 1A and 1C, but the features of the invention are adaptable to other versions of the system 10. As illustrated in FIG. 2A, system 100 includes in-line trap 12 within the subterranean vault 11a. The vault 11a includes inlet 13 and outlet 14 each respectively connected to conduits 15 and 16 of a storm drain or sewer conduit. Flow through the system 100 is in the direction indicated by the arrow 101. The trap 12 includes a mesh net 17 that is attached to frame structure 18.

A bypass weir 102 is located above trap 12 to permit continued flow in the event that net 17 of the trap 12 is filled to capacity with debris or otherwise clogged, or in the event that the flow into the inlet 13 becomes greater than can pass through the trap 12. The weir 102 is a metal screen with large openings therein to allow water that rises to a level above the top of the traps to flow through. The weir 102 is hinged at its upper end 103 to the vault 11a so that it can pivot in the downstream direction, illustrated by the arrow 104 in FIG. 2B. Normally, however, under most overflow conditions, the weir remains in the position shown in FIG. 2A, locked in this position by a shear ring or other shear device 105 at its bottom edge to structure fixed to rails 19 that are provided to hold the traps 12 to the vault 11a.

Under extreme flow conditions, high flow rates of water and large pieces of debris that do not pass through the grate of the weir 102 cause pressure to increase on the weir 102. The shear ring 105 is designed to provide only limited movement of the weir 102 until forces on the weir 102 exceed a predetermined design threshold, whereupon the shear ring is designed to break, allowing the weir grate 102 to swing open to the position shown in FIG. 2B. The shear ring 105 is corrosive resistant material consistent with the tensile strength and temperature ranges of operation of the particular installation.

Figure 3A:
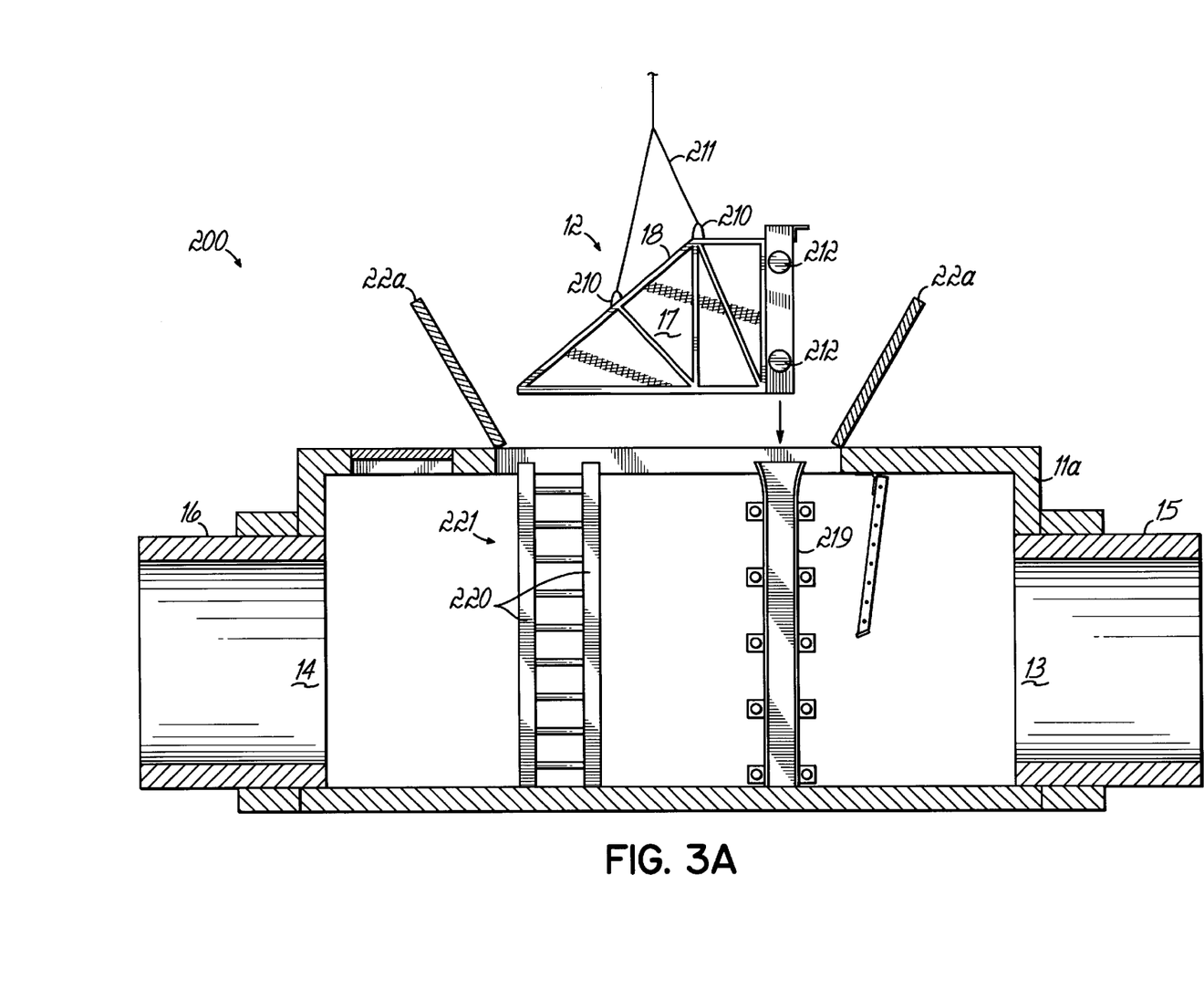
FIGS. 3A and 3B are cross-sectional views similar to FIGS. 2A and 2B of a system similar to that of FIG. 1A embodying other features of the present invention.
Figure 3B:
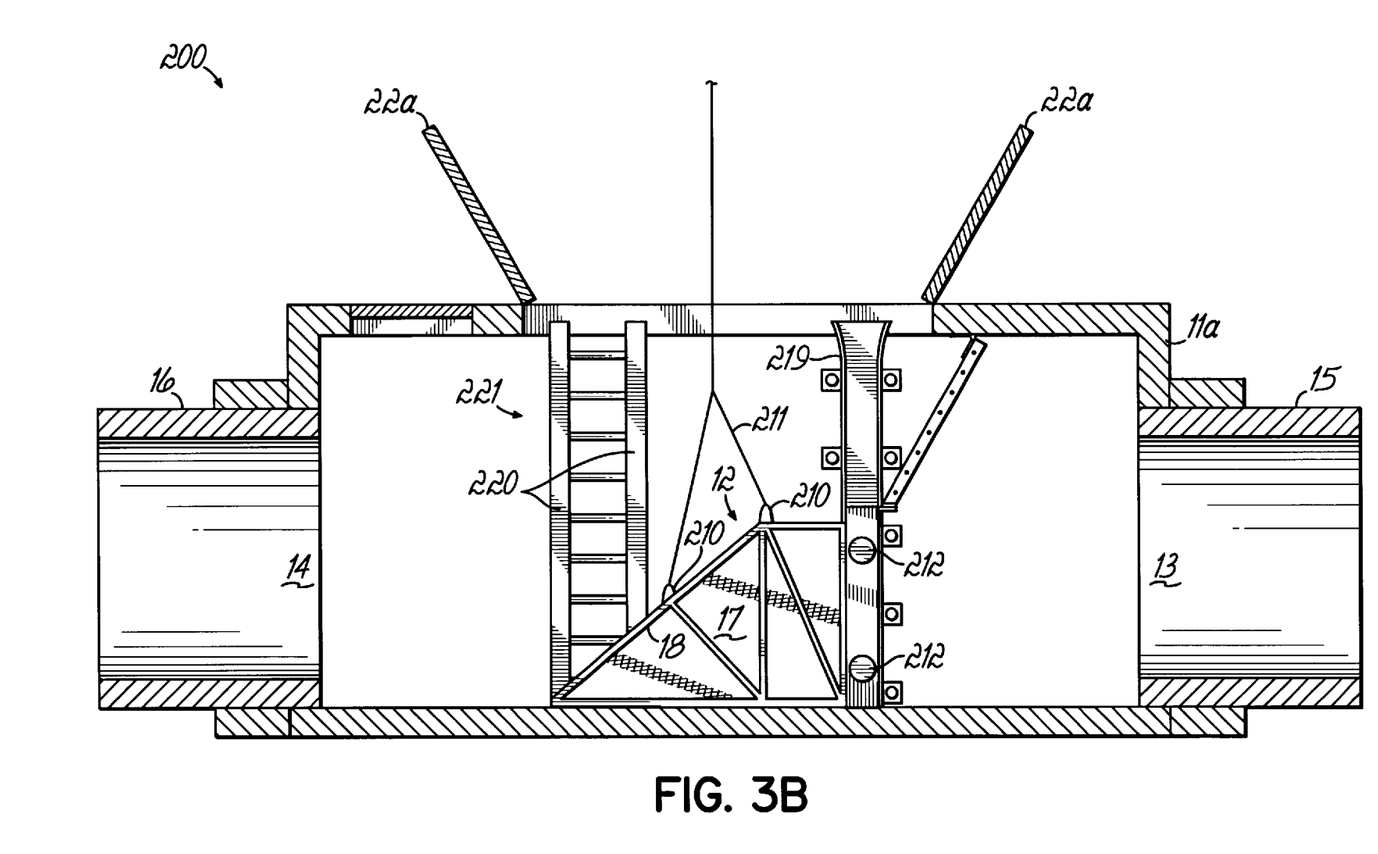

Another aspect of the present invention is embodied in the system 200 illustrated in FIGS. 3A and 3B. The system 200 is also similar to debris removal systems 10 of FIG. 1, particularly to version 10a thereof illustrated in FIG. 1A, but the features of the invention are adaptable to other versions of the system 10. As illustrated in FIGS. 3A and 3B, system 200 includes in-line trap 12 within the subterranean vault 11a. The vault 11a includes inlet 13 and outlet 14 each respectively connected to conduits 15 and 16 of a storm drain or sewer conduit. The trap 12 includes a mesh net 17 that is attached to frame structure 18. The frame 18 has hooks or eyebolts 210 on the top thereof to facilitate loading and removing of the trap 12 from the vault 11a by cables 211 through the doors 22a on the top of the vault 11a.

The frame 18 of the trap 12 has on each side thereof one or more rollers or large pins 212. The pins 212 hold the trap 12 in position in the vault 11a and facilitates the guiding of the trap 12 into and out of position in the vault 11a by locating the front of the frame 18 in openings in a pair of guide rails 219 that are fixed to the vault 11a. Guide rails may also be fixed to the vault 11a on opposite sides of the trap 12 to guide the downstream end of the trap 12 into position as it is loaded into the vault 11a. These are illustrated as plates 220 integrally formed on the face of the access ladder 221 that is fixed to the vault 11a and extends from the bottom thereof to the access doors 22a.

Figure 4A:
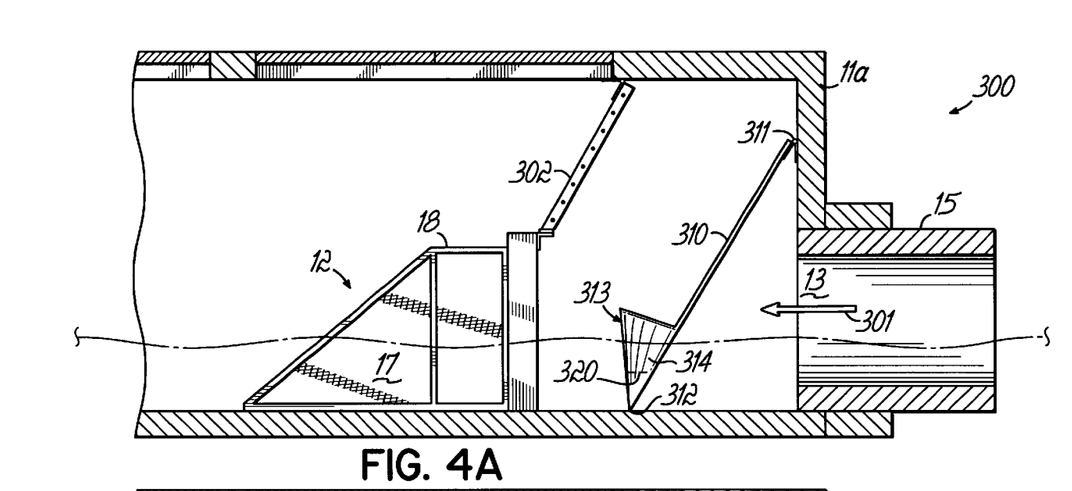
FIGS. 4A–4B are cross-sectional views similar to FIGS. 2A–2B and 3A–3B of a system similar to that of FIG. 1A embodying still other features of the present invention.
Figure 4B:
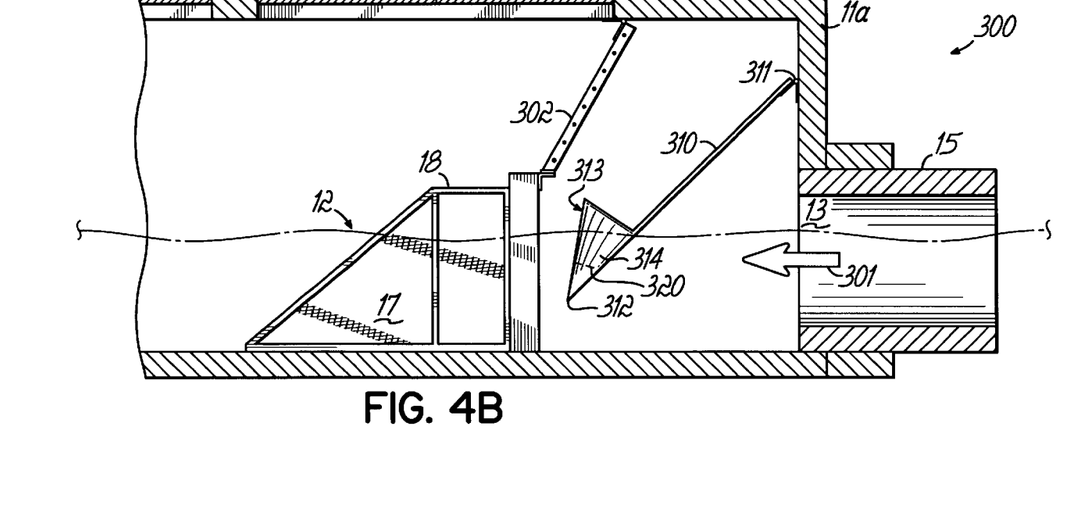
Figure 4C:
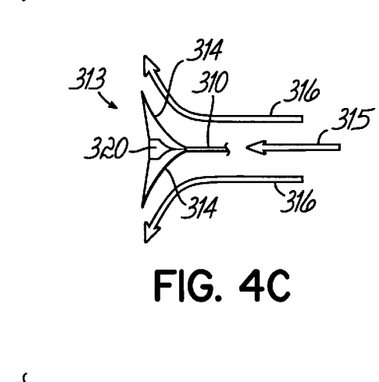
FIG. 4C is a diagrammatic top view of a portion of FIG. 4A.

Another aspect of the present invention is embodied in the system 300 illustrated in FIGS. 4A, 4B and 4C. The system 300 is similar to debris removal systems 10 of FIG. 1, particularly to version 10a thereof illustrated in FIG. 1A, but the features of the invention are adaptable to other versions of the system 10. As illustrated in FIG. 4A, system 300 includes in-line trap 12 within the subterranean vault 11a. The vault 11a includes inlet 13 connected to conduit 15 of a storm drain or sewer conduit. Flow through the system 300 is in the direction indicated by the arrow 301. The trap 12 includes a mesh net 17 that is attached to frame structure 18. A bypass weir 302 is located above trap 12 to permit continued flow in the event that net 17of the trap 12 is filled to capacity with debris or otherwise clogged, or in the event that the flow into the inlet 13 becomes greater than can pass through the trap 12.

Under certain conditions, flow through the inlet 13 exerts nonuniform pressure on the trap 12. This can be due to flow turbulence in the inlet conduit 15 or to flow concentrated at the center of the trap 12, which can particularly occur when the diameter of the inlet 13 is small. The system 300 is provided with a flow dissipating member 310 attached to the vault 11a at the upstream side of the trap 12 inside of the inlet 13. The flow dissipating member 310 may be fixed to the vault wall or, as illustrated, has a pivotal connection 311 to the vault 11a above the top of the inlet 13, so that, for example, its lower end 312 normally rests on the bottom of the vault 11a, as illustrated in FIG. 4A. Adjacent the lower end 312 of the member 310 is a plow-shaped blade 313 having two flared surfaces 314 that curve outwardly and extend in the downstream direction, as illustrated in FIG. 4C. The surfaces 314 of the blade 313 deflect the flow of water from the center of the inlet 13, indicated by the arrow 315, and spread the flow outwardly and more widely over the area of the inlet of the trap 12, as illustrated by the arrows 316. This deflection by the blade 313 enables the member 310 to absorb and dissipate energy in the flow and reduce the velocity of the flow entering the trap 12. The blade 313 also introduces turbulence in the flow, which absorbs additional energy in the flow. The blade 313 is provided with weights 320 in the downstream face thereof so that the pivoting of the member 310 results in lifting of the blade 313 from the bottom of the vault 11a in an amount that is proportional to the energy or velocity of water flowing into the inlet 13. The weights 320 can be changed, added or removed to calibrate the system 300 at each site to achieve the desired degree of velocity dissipation.

The force required to pivot the member 310 and lift the blade 313 is determined by the design shape of the blade 313 plow and the weights 320 on the downstream face of the blade 313, and is related to the flow velocity and height of the water in the chamber of the vault 11a. The design is preferably selected so that the force required to lift the blade 313 increases as the flow velocity and depth of the water increases. This provides a self adjusting characteristic and results in increasing velocity dissipation with increasing height and velocity of flow to achieve a desired downstream velocity level over a range of flow velocities. Additionally, because of the shape of the plow-shaped velocity dissipation element and the way it hangs from the pivot point above the main flow of the water and moves up and down with changed in the velocity, it is self cleaning in that floatables or trash does not stick to become caught on the surface of the plow.

Figure 5:
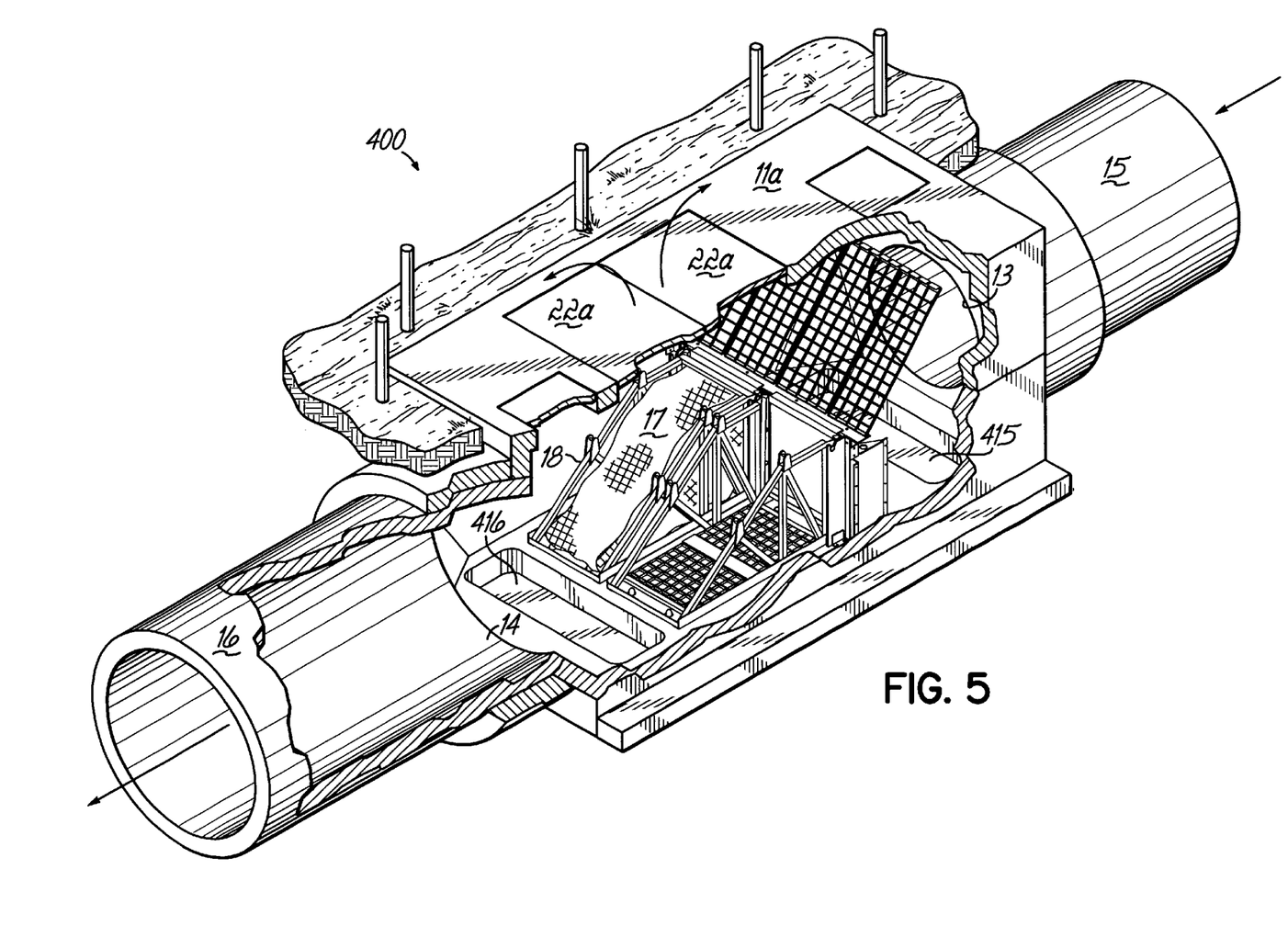
FIG. 5 is a perspective view of a system similar to that of FIG. 1A illustrating yet other features of the present invention.

A further aspect of the present invention is embodied in the system 400 illustrated in FIG. 5. The system 400 is also shown in an embodiment similar to debris removal systems 10 of FIG. 1 and particularly to version 10a thereof illustrated in FIG. 1A. As illustrated in FIG. 5, system 400 includes in-line traps 12 within the subterranean vault 11a having an inlet 13 and outlet 14 each respectively connected to conduits 15 and 16. Flow through the system 400 is in the direction indicated by the arrow 401. The traps 12 each include a mesh net 17 that is attached to frame structure 18.

The system 400 is provided with structure for collecting small settling suspended solids from flowing water both before and after the passing through the traps 12. This structure includes deep bottom pits 415 and 416 respectively upstream and downstream of the traps 12. These pits are sized and shaped to generate low flow velocity in water passing over them, allowing suspended solids that are smaller than those collected by the traps to settle in them. The pits 415 and 416 provide this function while adding a minimum of parts to the system 400 and can be easily cleaned.

Other applications of the invention can be made. Those skilled in the art will appreciate that the application of the present invention herein are varied, and that the invention is described in preferred embodiments. Accordingly, additions and modifications can be made without departing from the principles of the invention.

Accordingly, the following is claimed:

1. A floatable-debris removal system comprising:
an enclosure having an access door on the top thereof;
a pair of vertical rails in the enclosure extending from the bottom thereof to the door, the rails having channels therein with openings at the top end of the rails;
a floating-debris removal trap having a frame, an inlet end and a downstream end; and
at least one guide element on the frame at the inlet end thereof, the guide elements configured to slide vertically in the channels of the rails and into and out of the openings therein;
a vertical guide plate fixed to the enclosure and positioned to guide the downstream end of the frame as the trap is being guided by the guide elements sliding in the channels of the rails; and
a service access ladder extending from the door to the bottom of the enclosure;
the vertical guide plate being fixed to the ladder.

2. A floatable-debris removal system comprising:
an enclosure having a flow inlet and a flow outlet;
a floating-debris removing trap inside of the enclosure, the trap having a frame, an inlet end facing the flow inlet of the enclosure and a downstream end toward the flow outlet of the enclosure; and
a bypass weir located in the enclosure including a grate pivotally connected at the top thereof to the enclosure so as to pivot between a lowered, closed position and a raised, open position, the grate being positioned so that water flows against it during high flow conditions;
a member securing the grate in its lowered, closed position, the member being releasable when force on the grate exceeds a predetermined threshold condition; and
the member being a shear element that breaks when the force on the grate exceeds the predetermined threshold condition.

3. A floatable-debris removal system comprising:
an enclosure having a flow inlet and a flow outlet;
a floating-debris removing trap inside of the enclosure; the trap having a frame, an inlet end facing the flow inlet of the enclosure and a downstream end toward the flow outlet of the enclosure; and
a flow velocity dissipating member located in the enclosure between the flow inlet and the inlet end of the trap, the flow velocity dissipating member having a velocity altering blade thereon.

4. A floatable-debris removal system comprising:
an enclosure having a flow inlet and a flow outlet;
a floating-debris removing trap inside of the enclosure, the trap having a frame, an inlet end facing the flow inlet of the enclosure and a downstream end toward the flow outlet of the enclosure;
a flow velocity dissipating member located in the enclosure between the flow inlet and the inlet end of the trap, the flow velocity dissipating member being pivotally connected to the enclosure so as to rest in a position by gravity.

5. The system of claim 4 wherein:
the flow dissipating member is pivotally connected at its top end to the enclosure and rests in a lowered position by gravity.

6. The system of claim 4 wherein:
the flow dissipating member is pivotally connected at its top end to the enclosure and rests in a lowered position by gravity, the member having a blade situated between the flow inlet and the inlet end of the trap so as to pivotally move to a different position in response to the flow of water against the blade.

7. The system of claim 4 wherein:

the flow dissipating member is pivotally connected at its top end to the enclosure and rests in a lowered position by gravity and is moveable to a raised position in response to the velocity of water moving against it; the member having a weight thereon that is changeable so as to change said response as a function of said velocity.

8. A sewage or storm water flow velocity dissipating assembly comprising:

a flow velocity dissipating member configured to be positioned in-line in a flow path of a sewage or storm water system;

the flow velocity dissipating member being pivotally connectable at its top to structure that is fixed relative to the system so as to rest in a lowered position by gravity;

the member having a flow responsive surface thereon positioned to lie in the flow path when the member is pivotally connected to said structure and is resting in the lowered position, the surface being configured to impede the flow of sewage or storm water along said path and to pivot the member from the lowered position and move the member toward a raised position in response to said flow of sewage or storm water along the path and against the flow responsive surface; and the member having a removable weight thereon that is changeable so as to change said response as a function of said flow of water against the flow responsive surface.

9. A section of a sewage or storm water system having said structure fixed thereto and said flow path extending therethrough, the section having pivotally mounted to said structure the assembly of claim 8.

10. A floatable-debris removal system comprising the assembly of claim 8 and further comprising:

an enclosure having a flow inlet, a flow outlet, and a floating-debris removing trap inside of the enclosure with an inlet end facing the flow inlet of the enclosure and a downstream end toward the flow outlet of the enclosure;

the flow velocity dissipating member being positioned in-line in a flow path that extends through the flow inlet, the trap and the flow outlet.

11. A sewage or storm water flow velocity dissipating assembly comprising:

a flow velocity dissipating member configured to be positioned in-line in a flow path of a sewage or storm water system;

the flow velocity dissipating member being pivotally connectable at its top to structure that is fixed relative to the system so as to rest in a lowered position by gravity;

the member having a flow responsive surface thereon positioned to lie in the flow path when the member is pivotally connected to said structure and is resting in the lowered position, the surface being configured to impede the flow of sewage or storm water along said path and to pivot the member from the lowered position and move the member toward a raised position in response to said flow of sewage or storm water along the path and against the flow responsive surface; and the flow responsive surface including a plow-shaped blade having two flared surfaces that curve outwardly and extend in the downstream direction and are configured to deflect the flow of water from the center of the plow-shaped blade and spread the flow outwardly in opposite directions.

* * * * *

UNITED STATES PATENT AND TRADEMARK OFFICE
CERTIFICATE OF CORRECTION

PATENT NO.    : 6,478,954 B1
DATED         : November 12, 2002
INVENTOR(S)   : Turner, Jr. et al.

It is certified that error appears in the above-identified patent and that said Letters Patent is hereby corrected as shown below:

Column 2,
Line 30, reads "nets of the trap in the main contributor" and should read -- nets of the trap is the main contributor --.

Column 3,
Line 17, reads "traps fo the frame" and should read -- traps on the frame --.

Column 8,
Line 42, reads "enclosure; the" and should read -- enclosure, the --.

Signed and Sealed this

First Day of July, 2003

JAMES E. ROGAN
*Director of the United States Patent and Trademark Office*